(12) United States Patent
Schmidt

(10) Patent No.: US 6,362,459 B1
(45) Date of Patent: Mar. 26, 2002

(54) ELECTRONICALLY CONTROLLED ROASTER OVEN WITH DIGITAL CONTROL ASSEMBLY

(75) Inventor: Bruce E. Schmidt, Maribel, WI (US)

(73) Assignee: The Metal Ware Company, Two Rivers, WI (US)

( * ) Notice: Subject to any disclaimer, the term of this patent is extended or adjusted under 35 U.S.C. 154(b) by 0 days.

(21) Appl. No.: 09/760,116

(22) Filed: Jan. 12, 2001

(51) Int. Cl.[7] .............................. A21B 3/00; A47J 36/00; A47J 37/00
(52) U.S. Cl. ........................ 219/414; 219/400; 219/435; 219/399; 99/325
(58) Field of Search ................................. 219/414, 390, 219/391, 399, 400, 412, 435, 441; 361/678, 690, 692; 99/403, 325, 447

(56) References Cited

U.S. PATENT DOCUMENTS

| | | | | |
|---|---|---|---|---|
| 3,393,295 A | * | 7/1968 | Jepson et al. ............... | 219/398 |
| 3,527,154 A | * | 9/1970 | Shaper et al. ................. | 99/400 |
| 3,757,671 A | * | 9/1973 | Warshauer et al. .......... | 219/400 |
| 5,477,029 A | * | 12/1995 | Skutt et al. .................. | 219/390 |
| 5,539,185 A | * | 7/1996 | Polster ........................ | 219/439 |
| 5,734,149 A | * | 3/1998 | Skutt et al. .................. | 219/390 |
| 6,229,507 B1 | * | 5/2001 | Nakamura et al. .......... | 361/690 |

* cited by examiner

Primary Examiner—Joseph Pelham
(74) Attorney, Agent, or Firm—William K. Baxter; Godfrey & Kahn, S.C.

(57) ABSTRACT

An electronically controlled cooking apparatus for preparing and cooking food, such as a roaster oven, includes a main body having a bottom portion or base with sidewalls extending upwardly therefrom, a cover for covering the main body of the cooking apparatus, and a control assembly for controlling operation of the cooking apparatus that is mounted to the bottom of the base in a recessed pocket formed therein. The control assembly is mounted in the recessed pocket in a spaced apart relationship such that there is a gap between the control assembly and the recessed pocket, allowing air to circulate around the control assembly for keeping the control assembly and its internal circuitry cool. The control assembly includes a control panel covering the front of the recessed pocket and extending outwardly therefrom.

26 Claims, 8 Drawing Sheets

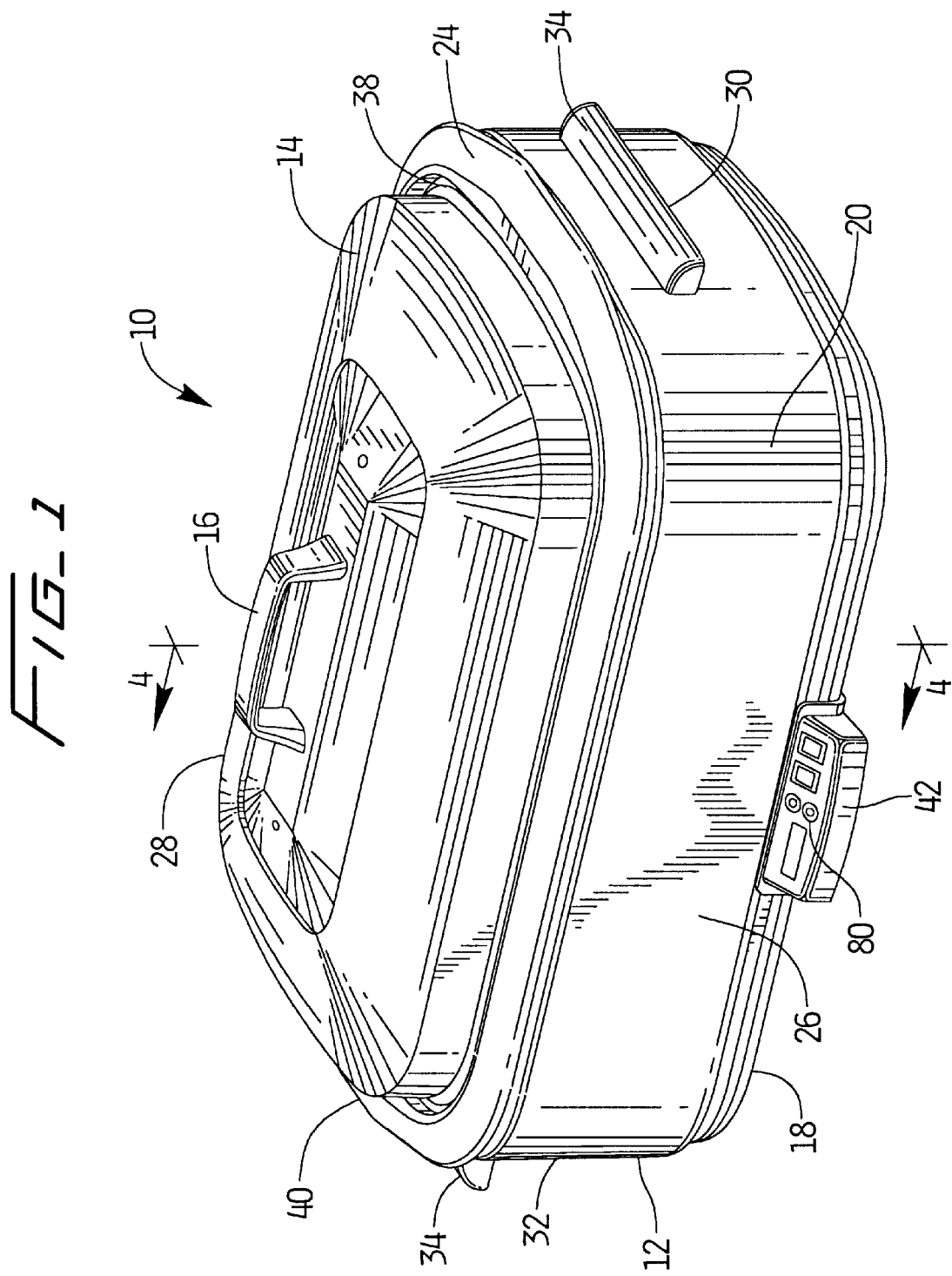

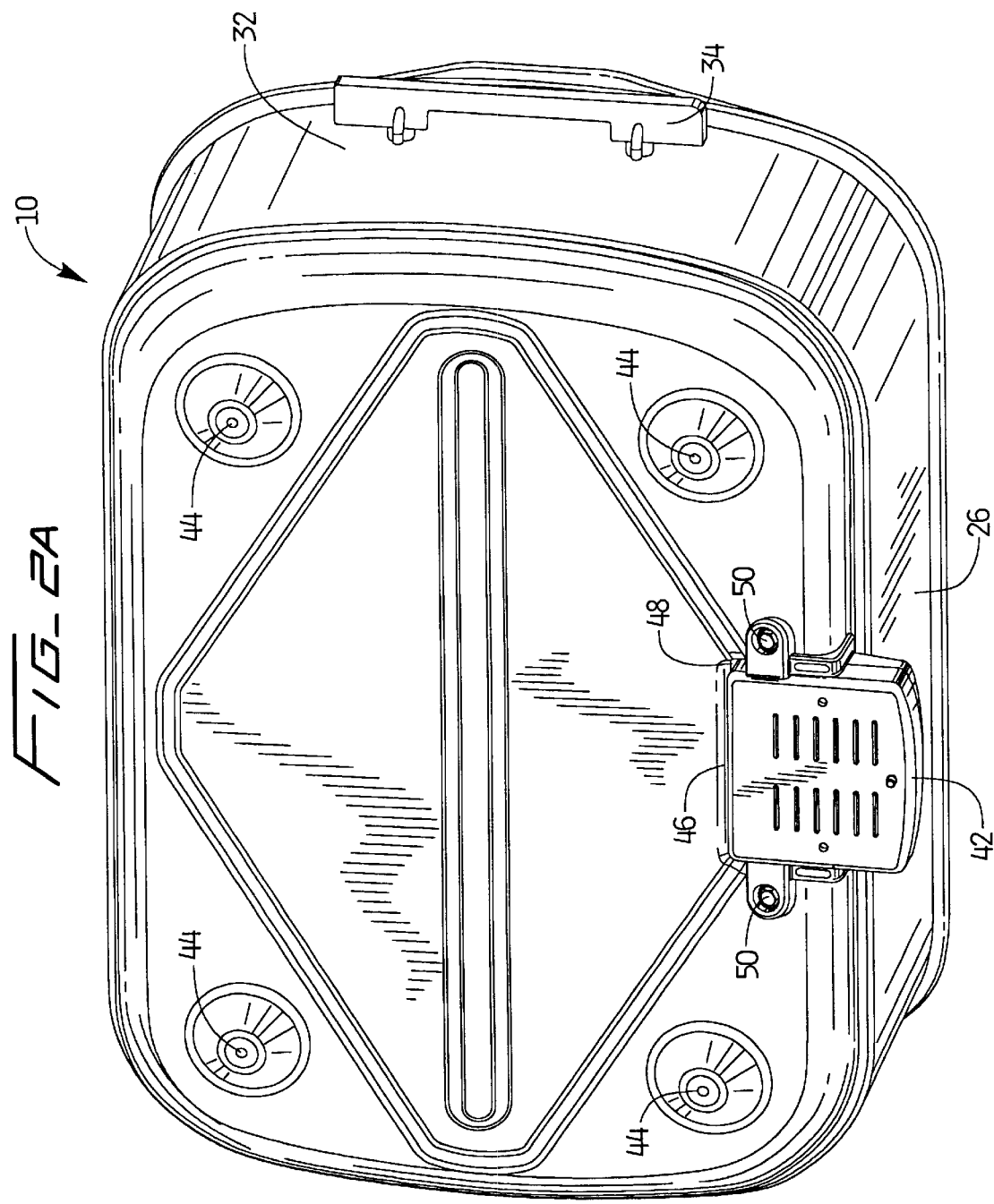

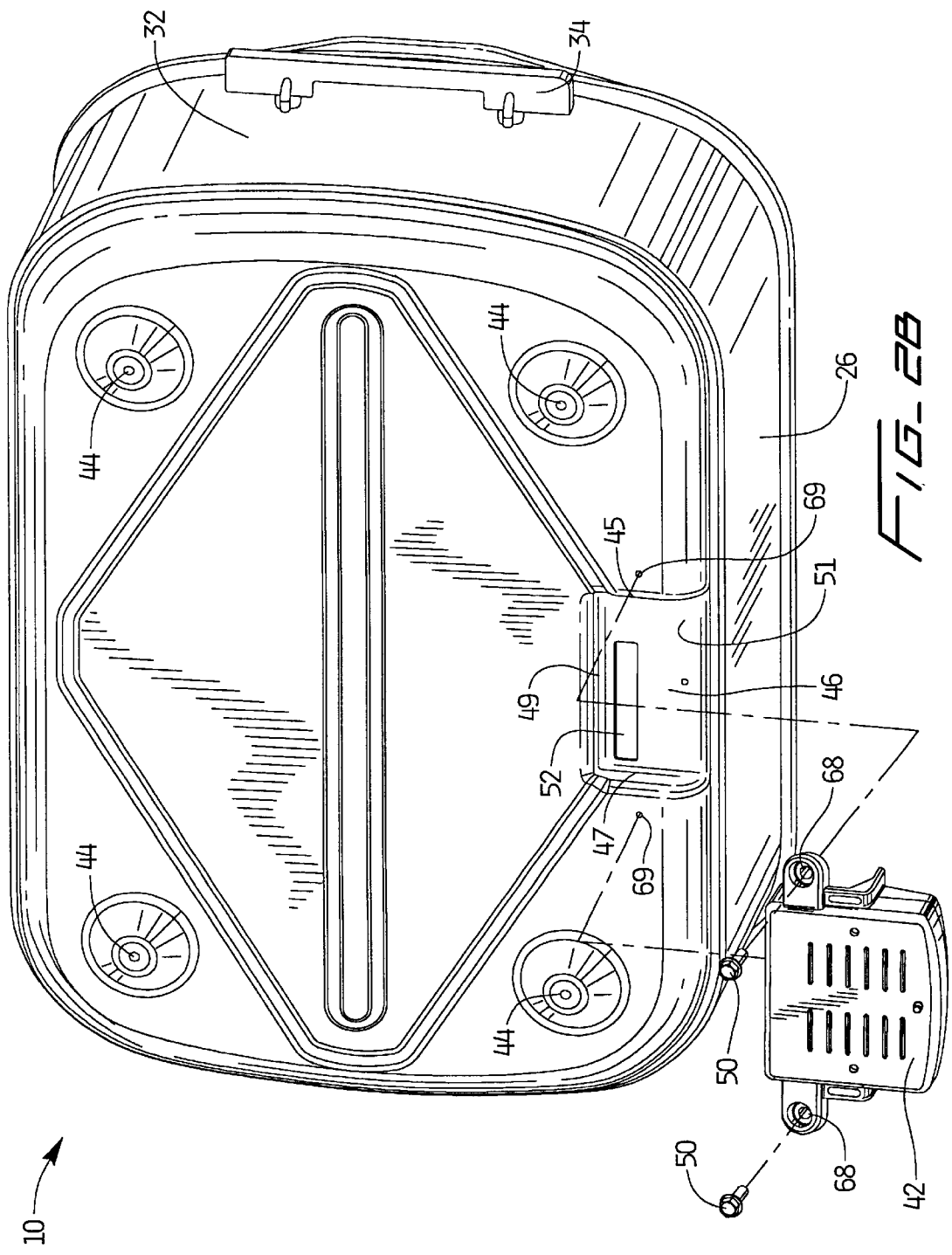

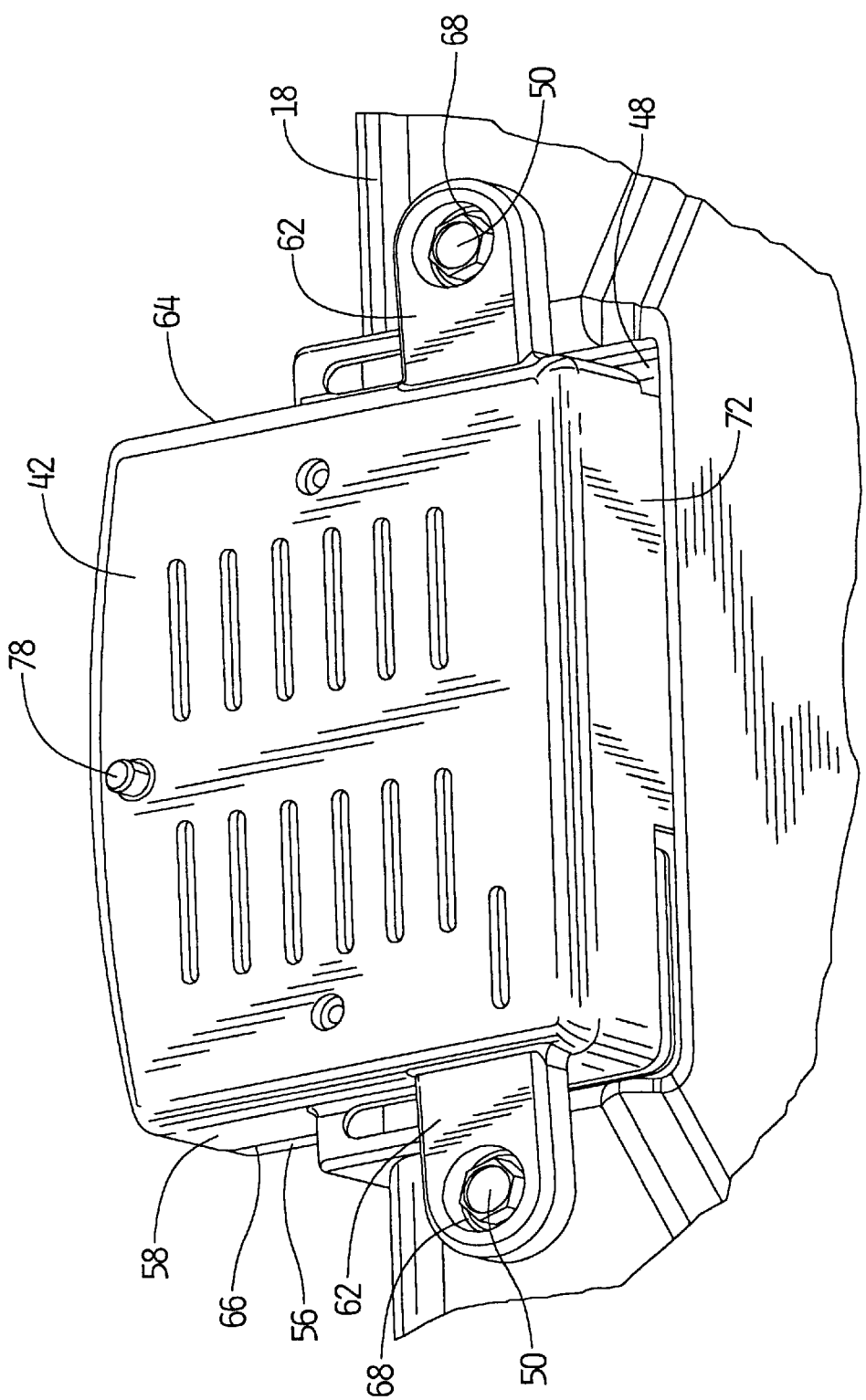

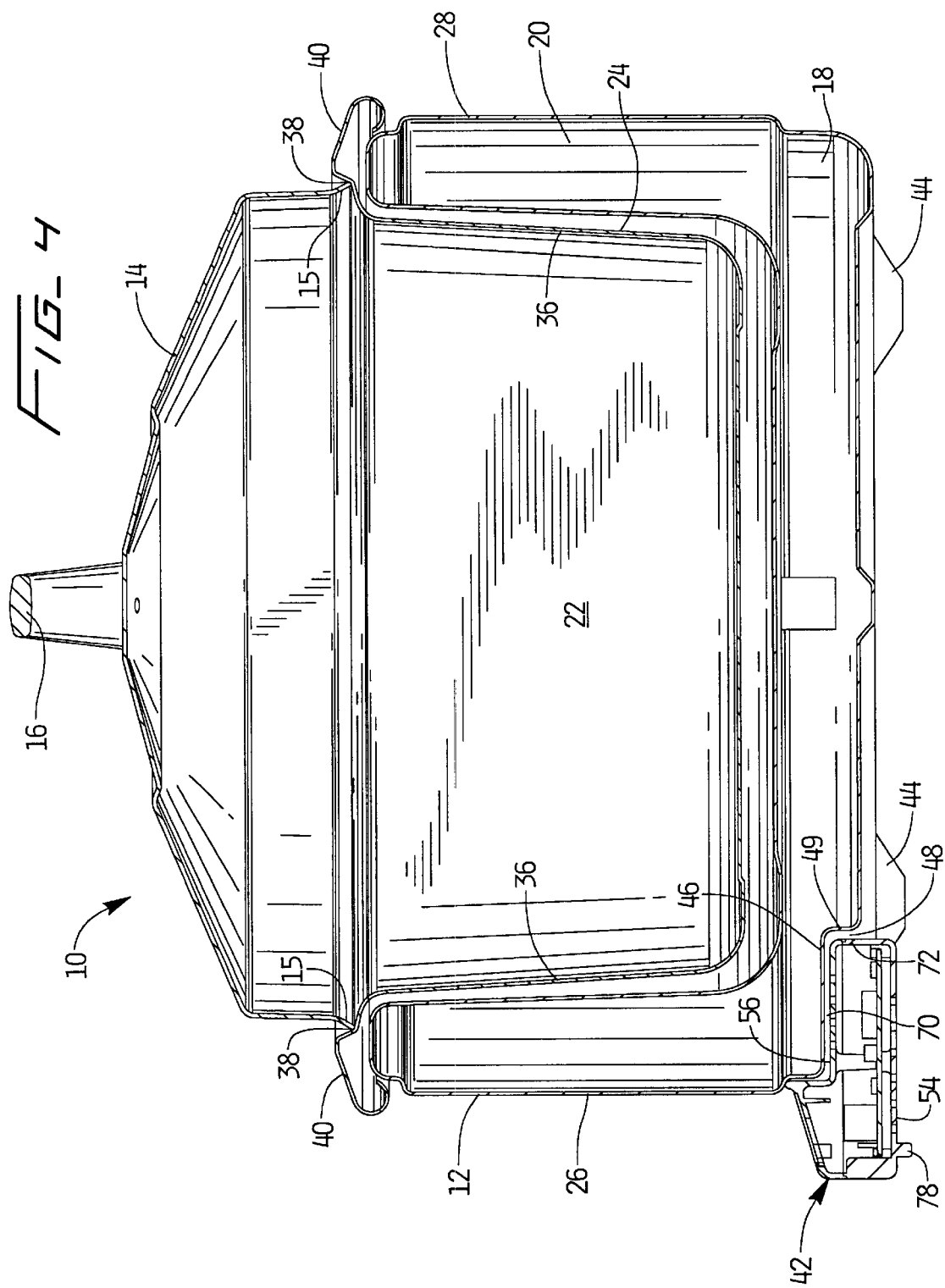

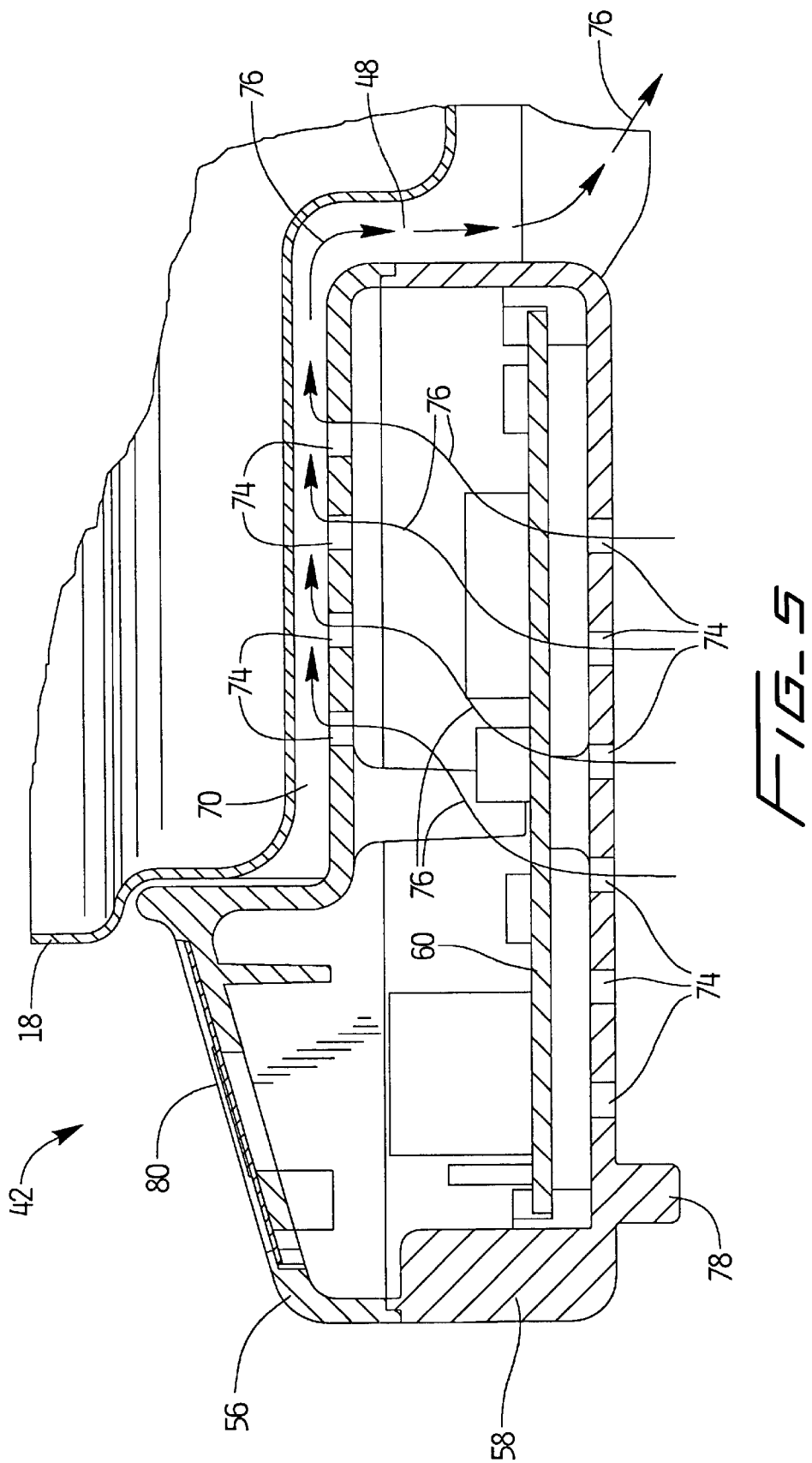

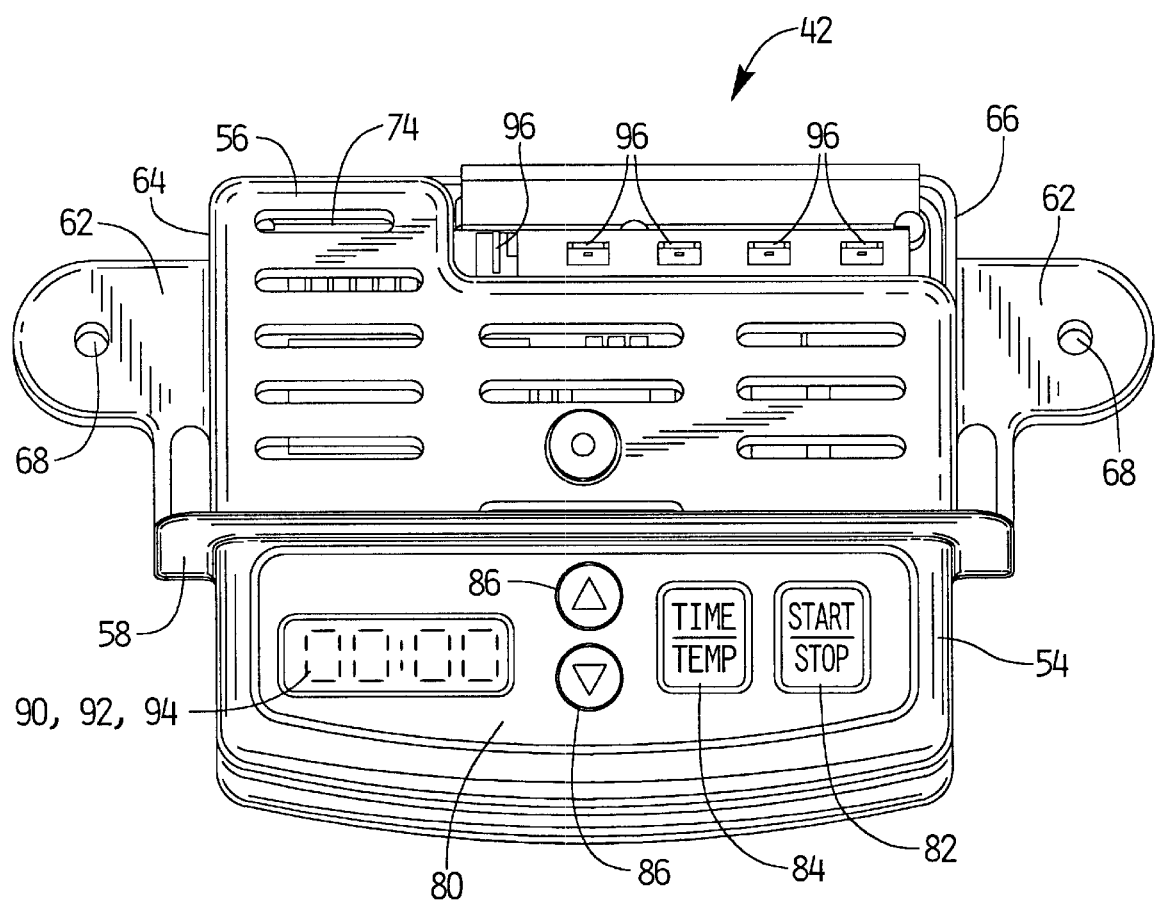
FIG_6A

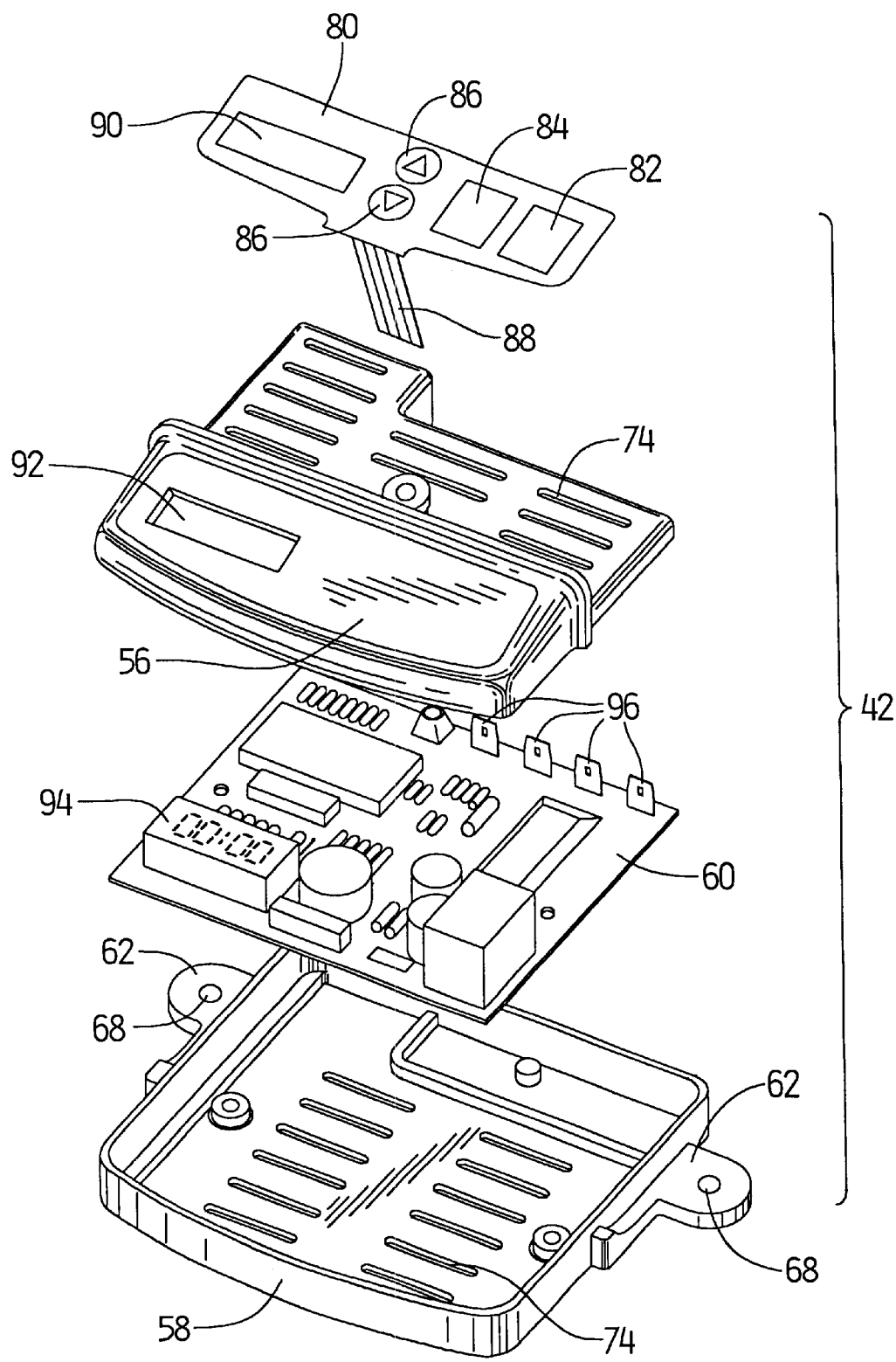
FIG_6B

ELECTRONICALLY CONTROLLED ROASTER OVEN WITH DIGITAL CONTROL ASSEMBLY

FIELD OF THE INVENTION

The present invention relates generally to a cooking apparatus, and more particularly to an electronically controlled roaster oven with a digital control assembly attached to the base thereof in a spaced apart relationship such that there is a gap between the assembly and the base to allow airflow around and through the assembly for cooling the electronic circuitry within the assembly.

BACKGROUND OF THE INVENTION

Roaster ovens used for preparing and cooking food are well known in the art. The conventional roaster oven includes a main body and a cover that fits on the main body of the oven. The main body typically includes a bottom portion or base with sidewalls extending upwardly therefrom to create an open cavity for a cookwell to be inserted therein. Handles are typically attached at opposite ends of the outer sidewalls of the main body for ease in carrying the roaster oven. The cover also includes a handle attached to the top thereof. The cover typically rests on an upper edge or inner rim of the cookwell during cooking, and to keep food warm before serving. The cover is removed from the main body of the roaster oven during the serving of food and during cleaning.

Most prior art household electric cooking appliances, such as roaster ovens, slow cookers or crock-pots are not electronically controlled. Typically, the cooking appliance is merely plugged into an AC outlet with a power cord and turned on. The cooking temperature, if controlled at all, is controlled with a knob on the front of the appliance that will set the cooking temperature between low, medium, and high. The cooking time is generally not set or controlled by the appliance. It is most often left up to the person cooking to monitor the cooking time.

With the advent of smaller electronics and electronics packaging, these small household cooking appliances are becoming much more sophisticated and complex. In fact, electronically controlled cooking appliances with programmable cooking temperatures and cooking times are becoming more common place. However, a problem exists with locating or placing electronics on or in close proximity with a heat generating cooking appliance. The electronics must be kept cool enough to prevent failures and low reliability.

Therefore, it would be desirable to provide an electronically controlled roaster oven with a digital control assembly attached thereto such that the electronics within the digital control assembly remain cool and reliable.

SUMMARY OF THE INVENTION

Therefore, in view of the problems associated with the prior art cooking appliances, it is an object of the present invention to provide a cooking apparatus, which overcomes the drawbacks of the prior art. In particular, it is an object of the present invention to provide an electronically controlled cooking apparatus with a digital control assembly attached thereto such that the electronics within the digital control assembly remain cool and reliable. It is another object of the invention to provide an electronically controlled cooking apparatus having a digital control assembly attached thereto in a spaced apart relationship, allowing airflow around the digital control assembly, keeping it cool. Another object of the invention is to provide a cooking apparatus having a simple design for removing or channeling heat away from a digital control assembly fastened to the base of the cooking apparatus. These and other objects are met by the roaster oven of the present invention.

The present invention provides a cooking apparatus, such as a roaster oven, comprising a main body, a cover for covering the main body, and a control assembly for controlling operation of the cooking apparatus. The main body includes a base with upwardly extending sidewalls creating an open cavity within the main body of the cooking apparatus for receiving a cookwell therein. The cover includes a handle attached to a top portion of the cover. The sidewalls include handles located at opposite ends of the main body to facilitate carrying of the cooking apparatus. The cookwell includes sidewalls with an upper edge and a flange extending around the periphery of the sidewalls. The control assembly is preferably attached to the bottom of the base with a control panel extending outwardly therefrom for programming operation of the cooking apparatus.

A recessed pocket is formed in the bottom of the base for receiving the control assembly therein. The recessed pocket, formed toward the front of the bottom of the base, includes two opposed sidewalls, a rear wall, a top wall, and an open front. The control panel covers the open front of the recessed pocket, while extending outwardly therefrom. The recessed pocket is preferably larger than the outer dimensions of the control assembly, so that when the control assembly is mounted within the recessed pocket and fastened to the bottom of the base, the control assembly is in a spaced apart relationship with respect to the recessed pocket, creating a gap between the control assembly and the recessed pocket, thereby allowing airflow around the control assembly.

The control assembly includes a housing with a top portion and a bottom portion having a plurality of slotted openings extending therethrough for allowing airflow through the assembly. The gap between the control assembly and recessed pocket, and the slotted openings extending through the control assembly housing allow for convection cooling of the control assembly during operation of the cooking apparatus.

Various other features, objects, and advantages of the invention will be made apparent to those skilled in the art from the accompanying drawings and detailed description thereof

BRIEF DESCRIPTION OF THE DRAWINGS

FIG. 1 is a perspective view of a roaster oven constructed in accordance with a preferred embodiment of the present invention;

FIG. 2A is a perspective view of the bottom of the roaster oven of FIG. 1;

FIG. 2B is a perspective view of the bottom of the roaster oven of FIG. 1 with the digital control assembly removed;

FIG. 3 is an enlarged perspective view of the bottom of the digital control assembly attached to the roaster oven;

FIG. 4 is a cross-sectional view of the roaster oven taken along line 4—4 of FIG. 1;

FIG. 5 is an enlarged cross-sectional view of the digital control assembly of FIG. 4;

FIG. 6A is a front perspective view of the digital control assembly; and

FIG. 6B is an exploded perspective view of the digital control assembly.

DETAILED DESCRIPTION OF THE INVENTION

Referring first to FIGS. 1 and 4, a cooking apparatus 10, such as a roaster oven, for preparing or cooking food is shown. The cooking apparatus 10 includes a main body 12, a cover 14, and a digital control assembly 42. The main body 12 includes a bottom portion or base 18 with sidewalls 20 extending upwardly therefrom to create an open cavity 22 for receiving a cookwell 24 therein. The cookwell 24 is preferably inserted within the open cavity 22 of the main body 12 for holding food items to be cooked in the cooking apparatus 10. The cover 14 may be mounted on the main body 12 as shown, or may be removed from the main body 12 by lifting a handle 16 attached to a top portion of the cover 14. The digital control assembly 42 is preferably attached to the bottom of the base 18 with a control panel 80 extending outwardly therefrom for programming operation of the cooking apparatus 10.

The main body 12 of the cooking apparatus 10 is shown to be rectangularly shaped with front and rear opposed sidewalls 26, 28 comprising the front and rear of the cooking apparatus 10, and two opposed end sidewalls 30, 32, which are generally shorter in length than the front and rear sidewalls 26, 28. The main body 12 of the cooking apparatus 10 may also be oval shaped, round, or square. Each of the end sidewalls 30, 32 include a handle 34 attached thereto for carrying the cooking apparatus 10. The cookwell 24 includes sidewalls 36 with an upper edge 38 and a flange 40 extending around the periphery of the sidewalls 36. The digital control assembly 42 is fastened to the bottom base 18 below the front sidewall 26.

Referring next to FIGS. 2A and 2B, illustrating the bottom of the cooking apparatus 10. The bottom of the base 18 includes a plurality of feet 44 for supporting the cooking apparatus 10 on a flat surface, and a recessed pocket 46 formed in the bottom of the base 18 for receiving the digital control assembly 42 therein. The pocket 46 is preferably located toward the front of the bottom of the base 18 and preferably sized larger than the outer dimensions of the digital control assembly 42 to create an open channel 48 between the digital control assembly 42 and the base 18. The recessed pocket 46 is preferably about ¼ inch larger than the outer dimensions of the digital control assembly 42. The pocket 46 includes two opposed sidewalls 45, 47, a rear wall 49, a top wall 51, and an open front. The digital control assembly 42 is inserted within the pocket 46 and fastened to the bottom of the base 18 by a plurality of fasteners 50. The pocket further includes an opening 52 extending through the top wall 51 providing for electrical connections between the digital control assembly 42 and a heating element within the cooking apparatus 10. The heating element contains heating wires extending through the base 18 and sidewalls 20 of the cooking apparatus 10 which are coupled to the digital control assembly 42 through the opening 52 in the top wall 51 of the pocket 46.

FIG. 3 shows an enlarged view of the digital control assembly 42 fastened to the bottom of the base 18. The digital control assembly 42 comprises a housing 54 with a top portion 56 and a bottom portion 58 enclosing a printed circuit board 60 therein, FIG. 5, with the electronics for controlling operation of the cooking apparatus 10. The housing 54 is preferably made of a thermoplastic material. A pair of attachment arms 62 extend from opposing sides 64, 66 of the bottom portion 58 of the housing 54 for attaching the digital control assembly 42 to the base 18. Fasteners 50 extend through apertures 68 in the attachment arms 62 to screw holes 69 in the bottom of the base 18 to attach the digital control assembly 42 within the pocket 46 of the base 18. The position of the attachment arms 62 extending from the sides 64, 66 of the bottom portion 58 of the housing 54 is such that when the digital control assembly 42 is fastened to the bottom of the base 18, a gap 70 exists between the top portion 56 of the housing 54 and the top wall 51 of the pocket 46, allowing air to circulate around the housing 54 of the digital control assembly 42, keeping it cool.

Referring again to FIG. 4, a cross-sectional view of the cooking apparatus 10 shows the digital control assembly 42 attached to the bottom of the base 18 in pocket 46. A channel 48 extends around the digital control assembly 42 between the sides 64, 66 and rear 72 of the housing 54 and the sidewalls 45, 47 and rear wall 49 of the pocket 46. A gap 70 also exists between the top portion 56 of the housing 54 and the top wall 51 the pocket 46. The digital control assembly 42, is therefore, spaced apart from sidewalls 45, 47, rear wall 49, and top wall 51 of the pocket 46.

FIG. 4 also shows the cover 14 covering the open cavity 22 and cookwell 24 inserted within the main body 12 of the cooking apparatus 10. The cover 14 includes a flange 15 that rests on the upper edge 38 of the cookwell sidewalls 36 with the cover 14 in a closed position on the main body 12 of the cooking apparatus 10.

FIG. 5 is an enlarged cross-sectional view of the digital control assembly 42 fastened to the bottom of the base 18, as shown in FIG. 4. Both the top and bottom portions 56, 58 of the digital control assembly housing 54 include a plurality of slotted openings 74 extending therethrough for allowing airflow through the assembly 42, as indicated by arrows 76. The bottom portion 58 of the housing 54 includes a footing 78 extending downwardly therefrom to substantially the same level as the feet 44 extending downwardly from the base 18 for allowing airflow under the cooking apparatus and up through the slotted openings 74 in the housing 54. The slotted openings 74 therefore, allow for convection cooling of the digital control assembly 42 during operation of the cooking apparatus 10.

FIGS. 6A and 6B illustrate enlarged and exploded views of the digital control assembly 42. As mentioned previously, the digital control assembly 42 comprises a housing 54 made up of a top portion 56 and a bottom portion 58, a printed circuit board 60 enclosed within the top and bottom portions 56, 58 of the housing 54, and a control panel 80. The control panel 80 includes a plurality of membrane switches or push buttons 82, 84, 86, 88 for programming the cooking time and cooking temperature of the cooking apparatus. The control panel 80 further includes a transparent viewing area 90, which is positioned over an opening 92 in the top portion 56 of the housing 54 for viewing an LED display 94 mounted on the printed circuit board 60. The control panel 80 is electrically connected to the printed circuit board 60 by a ribbon cable 88. In addition to the LED display 94, the printed circuit board 60 preferably also includes a microprocessor and associated circuitry for controlling operation of the cooking apparatus. The circuitry performs a slow cook function and includes a countdown timer that will automatically shut off the cooking apparatus when the programmed cooking time has expired. Electrical connections to and from the circuit board 60 are made from terminals 96 extending from the circuit board 60 through opening 52 in the base 18.

Programming and operation of the cooking apparatus 10 is initiated through membrane switches 82, 84, 86 and 88. The START/STOP push button 82 activates the cooking apparatus 10 by turning it on and off. The TIME/TEMP push button 84 is used to program the cooking times and cooking temperatures. The up and down arrow push buttons 86, 88 are used to select the cooking times and cooking temperatures after the TIME/TEMP push button 84 has been pushed. In other words, once the START/STOP push button 82 is pushed, turning on the cooking apparatus, the TIMET-NUMP push button 84 is pushed to select the cooking time using the up and down arrow push buttons 86, 88. The TIME/TEMP push button 84 is pushed again to select the cooking temperature using the up and down arrow push buttons 86, 88. The START/STOP push button 82 is pushed again to start cooking and initiate the countdown timer. Pushing the START/STOP push button 82 again interrupts the cooking and stops the countdown timer. To reactivate cooking and the countdown timer, the START/STOP push button 82 must be pushed once again. Once the cooking time has elapsed, the cooking apparatus automatically shuts off. The cooking temperature may be programmed for between 150 and 450 degrees Fahrenheit, and the cooking time may be programmed for up to 10 hours.

While the invention has been described with reference to preferred embodiments, those skilled in the art will appreciate that certain substitutions, alterations, and omissions may be made without departing from the spirit of the invention. Accordingly, the foregoing description is meant to be exemplary only and should not limit the scope of the invention set forth in the following claims.

What is claimed is:

1. A cooking apparatus comprising:
   a main body having a base at the bottom of the cooking apparatus with upwardly extending sidewalls, the base and upwardly extending sidewalls having an inner surface and an outer surface;
   a recessed pocket formed in the outer surface of the base; and
   a control assembly mounted in the recessed pocket of the base in a spaced apart relationship such that there is a gap between the control assembly and the recessed pocket, allowing airflow around the control assembly.

2. The cooking apparatus of claim 1 wherein the recessed pocket includes two sidewalls, a rear wall, a top wall, and an open front.

3. The cooking apparatus of claim 2 wherein the recessed pocket is sized larger than the control assembly creating a channel between the control assembly and the sidewalls, rear wall, and top wall of the pocket.

4. The cooking apparatus of claim 2 wherein the recessed pocket further includes an opening extending through the top wall providing for electrical connections between the control assembly and the cooking apparatus.

5. The cooking apparatus of claim 1 wherein the control assembly includes a housing with a top portion and a bottom portion enclosing a printed circuit board therebetween with electronics for controlling operation of the cooking apparatus.

6. The cooking apparatus of claim 5 wherein the housing is made of a thermoplastic material.

7. The cooking apparatus of claim 5 wherein the top portion and the bottom portion of the housing include a plurality of slotted openings extending therethrough for allowing airflow through the housing.

8. The cooking apparatus of claim 5 wherein the housing includes a pair of attachment arms extending outwardly from opposite sides of the bottom portion of the housing for attaching the control assembly to the outer surface base.

9. The cooking apparatus of claim 8 wherein the attachment arms are positioned on the bottom portion of the housing such that a gap exists between the top portion of the housing and the top wall of the pocket, allowing airflow around the housing.

10. The cooking apparatus of claim 1 wherein the control assembly includes a control panel covering the open front of the recessed pocket and extending outwardly therefrom.

11. A cooking apparatus comprising:
    a main body having a base with upwardly extending sidewalls;
    a cover for covering the main body of the apparatus, the cover having a top portion with a handle attached thereto;
    a cookwell inserted within an open cavity formed in the main body by the upwardly extending sidewalls; and
    a control assembly mounted to the base of the main body in a recessed pocket formed in the base such that there is a gap between the assembly and the base.

12. The electronically controlled cooking apparatus of claim 11 wherein the recessed pocket includes two sidewalls, a rear wall, a top wall, and an open front.

13. The electronically controlled cooking apparatus of claim 12 wherein the recessed pocket is sized larger than the control assembly creating a channel between the control assembly and the sidewalls, rear wall, and top wall of the pocket.

14. The cooking apparatus of claim 12 wherein the recessed pocket further includes an opening extending through the top wall providing for electrical connections between the control assembly and a heating element within the cooking apparatus.

15. The cooking apparatus of claim 11 wherein the control assembly includes a housing with a top portion and a bottom portion enclosing a printed circuit board therebetween with electronics for controlling operation of the cooking apparatus.

16. The cooking apparatus of claim 15 wherein the top portion and the bottom portion of the housing include a plurality of slotted openings extending therethrough for allowing airflow through the housing.

17. The cooking apparatus of claim 15 wherein the housing includes a pair of attachment arms extending outwardly from opposite sides of the bottom portion of the housing for attaching the control assembly to the base of the main body.

18. The cooking apparatus of claim 17 wherein the attachment arms are positioned on the bottom portion of the housing such that a gap exists between the top portion of the housing and the top wall of the pocket, allowing air to circulate around and through the housing.

19. A roaster oven having a main body with a base, upwardly extending sidewalls, and a cover with a handle attached to a top portion thereof, the roaster oven comprising:
    a cookwell inserted within an open cavity formed in the main body by the upwardly extending sidewalls; and
    a control assembly mounted to the base of the main body in a recessed pocket formed in the base such that there is a gap between the assembly and the base.

20. The roaster oven of claim 19 wherein the control assembly is spaced apart from the recessed pocket.

21. The roaster oven of claim 19 wherein the control assembly includes a plurality of slotted openings extending therethrough for allowing airflow through the assembly.

22. A cooking device comprising:
    a cooking cavity having a base with upwardly extending sidewalls;
    a cover for covering the cooking cavity;
    a cookwell inserted within the cooking cavity; and
    a control assembly mounted to the base of the cooking cavity in a recessed pocket formed in the base such that there is a gap between the assembly and the base.

23. The cooking device of claim 22 wherein the control assembly is spaced apart from the recessed pocket.

24. The cooking device of claim 22 wherein the control assembly includes a plurality of slotted openings extending therethrough for allowing airflow through the assembly.

25. An apparatus for cooling electronic circuitry within a control assembly attached to a cooking device, the apparatus comprising:
 a main body having a base with upwardly extending sidewalls, the base and upwardly extending sidewalls having an inner surface and an outer surface; and
 a recessed pocket formed in the outer surface of the base for receiving the control assembly in a spaced apart relationship thereto such that there is a gap between the control assembly and the recessed pocket, allowing airflow around the control assembly.

26. The apparatus of claim 25 wherein the control assembly includes a control panel covering the front of the recessed pocket and extending outwardly therefrom.

* * * * *